United States Patent [19]

Miyoshi et al.

[11] Patent Number: 4,569,856

[45] Date of Patent: Feb. 11, 1986

[54] METHOD FOR PREPARING MAGNETIC RECORDING MEDIUM

[75] Inventors: Takahito Miyoshi; Kenichi Masuyama; Shin-ichiro Dezawa; Toshimitu Okutu; Norio Nasu; Nobuo Aoki; Masaaki Fujiyama, all of Kanagawa, Japan

[73] Assignee: Fuji Photo Film Co., Ltd., Kanagawa, Japan

[21] Appl. No.: 709,859

[22] Filed: Mar. 8, 1985

[30] Foreign Application Priority Data

Mar. 8, 1984 [JP] Japan ................................. 59-44465

[51] Int. Cl.4 .......................... B05D 5/12; H01F 10/02
[52] U.S. Cl. ..................................... 427/128; 428/900

[58] Field of Search ................................. 427/128–132, 427/48; 428/900, 694; 252/62.54

Primary Examiner—Bernard D. Pianalto
Attorney, Agent, or Firm—Sughrue, Mion, Zinn, Macpeak and Seas

[57] ABSTRACT

A method for preparing a magnetic recording medium is described, comprising (1) pre-dispersing ferromagnetic particles having an $S_{BET}$ specific surface area of 35 m$^2$/g or more and having an adjusted water content of 0.8 wt % or more with a binder, (2) adding an additional binder and a lubricating agent thereinto, mixing and dispersing them to prepare a diserpsion of a magnetic coating composition, and (3) coating the resulting dispersion of a magnetic coating composition on a non-magnetic support.

4 Claims, No Drawings

METHOD FOR PREPARING MAGNETIC RECORDING MEDIUM

FIELD OF THE INVENTION

The present invention relates to a method for preparing a magnetic recording medium, and more particularly it relates to a method for preparing a magnetic recording medium containing well dispersed ferromagnetic particles and having a higher S/N ratio.

BACKGROUND OF THE INVENTION

A coated type magnetic recording medium has been prepared by dispersing ferromagnetic particles in a binder, coating the resulting magnetic coating composition on a non-magnetic support, and conducting magnetic orientation, as well as a smoothing treatment, if necessary.

Various improvements have recently been made as better characteristics have been required for a magnetic recording medium (hereinafter referred to as a magnetic tape). One of the characteristics required to be improved is the S/N ratio (signal/noise). In order to improve the S/N ratio of a coated type magnetic tape, it is proposed to use ferromagnetic particles having a smaller particle size, that is, having a larger specific surface area. In this case, it is necessary that ferromagnetic particles should be homogeneously dispersed in a binder and that the coated surface of a magnetic layer should be smooth. However, as the particle size of ferromagnetic particles becomes smaller, it is more difficult to homogeneously disperse the ferromagnetic particles in the binder, whereby magnetic orientation of the ferromagnetic particles and surface smoothness of the magnetic layer deteriorate, and thus a higher S/N ratio cannot be obtained.

In order to improve dispersibility of ferromagnetic particles, various binders and dispersing aids have been studied, and mixing and kneading methods using various mixing and kneading devices (e.g., a two-roll mill, a three-roll mill, an open kneader, a pressure kneader or a continuous kneader) have been also studied as described, for example, in T. C. PATTON: Paint Flow and Pigment Dispersion (John Wiley & Sons, 1964), and U.S. Pat. Nos. 2,581,414 and 2,855,156.

The present inventors have studied mixing and kneading methods to improve the dispersibility in order to be able to obtain a magnetic tape having higher S/N ratio.

As described in the foregoing, a two-roll mill, a three-roll mill, an open kneader, a pressure kneader, and a continuous kneader are known for mixing and kneading the coating composition for a magnetic tape. However, using any one of these devices, the degree of mixing and kneading depends upon the quality of the ferromagnetic particles, and the relative quantities of binder and solvent, and it is extremely difficult to prepare a coating composition having the desired dispersibility. The difficulty increases as the particle size of the ferromagnetic particles becomes smaller. Thus it has been difficult to obtain a magnetic tape having better dispersibility and a higher S/N ratio when ferromagnetic particles having smaller particle size have been used and dispersed by a conventional method.

SUMMARY OF THE INVENTION

An object of the present invention is to provide a method for preparing a magnetic recording medium containing well dispersed ferromagnetic particles and having a higher S/N ratio.

The present inventors have made extensive studies regarding the dispersing method and the physical properties of ferromagnetic particles, and, as a result thereof, it has been found that when ferromagnetic particles having a particularly large specific surface area are mixed and kneaded with a binder, such mixing and kneading can be carried out sufficiently by adsorbing ferromagnetic particles with moisture in a predetermined amount, and by providing a pre-dispersing step, a mixing step, and a dispersing step.

The object of the present invention is achieved by a method for preparing a magnetic recording medium comprising (1) pre-dispersing ferromagnetic particles having an $S_{BET}$ specific surface area of 35 m$^2$/g or more and having adsorbent moisture content of 0.8 wt% or more with a binder, (2) adding an additional binder and a lubricating agent thereinto, mixing and dispersing them to prepare a dispersion of a magnetic coating composition, and (3) coating the resulting dispersion of a magnetic coating composition on a non-magnetic support.

DETAILED DESCRIPTION OF THE INVENTION

Ferromagnetic particles that can be used in the present invention include ferromagnetic iron oxide particles represented by $FeO_x$ and Co-containing $FeO_x$ ($4/3 \leq x \leq 3/2$) and ferromagnetic chromium dioxide particles. They have $S_{BET}$ specific surface area of 35 m$^2$/g or more.

Any methods can be used for providing ferromagnetic particles having a water content which is adjusted within the range of the present invention. For example, water can be provided with ferromagnetic particles in the step of preparing Co-added ferromagnetic iron oxide. That is, in the steps of coating cobalt compounds with iron magnetic particles, water-washing, filtering and drying, the water content can be adjusted during the drying step. Alternatively, a step of providing water can be added at a later stage.

Water content of the present invention is measured in accordance with the principle of determining water content by the Karl Fischer method.

Karl Fisher reagent reacts with water as follows:

$$I_2 + SO_2 + 3C_5H_5N + H_2O \rightarrow 2C_5H_5N \cdot HI + C_5H_5N \cdot SO_3 \quad (1)$$

In coulometric Karl Fischer titration, iodine is generated in direct proportion to the quantity of electricity, according to Faraday's law (2). When sample is added to an anodic solution in which iodide ion and sulfur dioxide are principle components, $$2I^- - 2e \rightarrow I_2 \quad (2)$$

water in the sample reacts with electrolytically generated iodine according to (1).

One mole of iodine reacts quantitatively with one mole of water. Thus, 1 mg of water is equivalent to 10.71 coulombs. Based on this principle, water content can be directly determined from the quantity of electricity (coulombs) required for electrolysis.

In the present invention, it is necessary that optimum water content of the ferromagnetic particles increases as the specific surface area of the ferromagnetic particles becomes larger.

It was conventionally considered that as the water content of the ferromagnetic particles is decreased, the more homogeneous dispersion is obtained since lower water content is considered to render the particles compatible with a solvent and since presence of water causes reaction between polyisocyanate and water. However, in accordance with this invention it has been found that this tendency is changed when the ferromagnetic particles are coarse particles.

In the first step (1) of the method of the present invention, moisture adjusted ferromagnetic particles are pre-dispersed with a binder.

A two-roll mill, a three-roll mill, an open kneader, a pressure kneader, or a continuous kneader is used for mixing and kneading ferromagnetic fine particles having an $S_{BET}$ specific surface area of 35 m²/g or more with a binder to disperse them homogeneously.

The time for dispersion is preferably from 10 min. to 6 hours.

In the second step (2), an additional binder and a lubricating agent are added, mixed and dispersed using a sand grinder, a ball mill or an attriter.

The period of time for the mixing and dispersing is preferably from 30 min. to 12 hours.

When ferromagnetic particles having an $S_{BET}$ specific surface area of 30 m²/g and a water content of from 0.3 wt% to 1.2 wt% (based on the weight of the ferromagnetic particles) are used, dispersion can be carried out substantially homogeneously using various mixing and kneading apparatuses.

However, when ferromagnetic particles having an $S_{BET}$ specific surface area of 35 m²/g are used, it is necessary that the ferromagnetic particles have water content of at least 0.8 wt%, and preferably from 0.8 wt% to 1.6 wt%, and that the above described pre-dispersing step (1) and mixing and dispersing step (2) should be carried out.

When ferromagnetic particles having water content in the above described range are used, and the coating composition prepared by mixing, kneading and dispersing the ferromagnetic particles, binders and lubricating agents are used, the resulting magnetic tape has a higher squareness ratio (SQ), excellent gloss, and a higher S/N ratio.

If only the second step is conducted without the first step of pre-dispersion using ferromagnetic particles having water content in the above-described range, the desired magnetic recording medium cannot be obtained.

If the water content is less than the above-described range, mixing and kneading cannot satisfactorily be carried out, and since the ferromagnetic particles cannot be homogeneously dispersed, the resulting magnetic tape has a lower squareness ratio, and a lower S/N ratio.

If the water content is higher than the above-described preferred range, mixing and kneading can be carried out satisfactorily. However, the excess amount of water present on the surface of ferromagnetic particles tends to react with isocyanate compounds which are added at the final step to prepare a coating composition, whereby pot life of the coating composition tends to be shortened, and the surface property of the resulting magnetic tape tends to deteriorate. As a result, the S/N ratio of the tape tends to decrease.

The binders and the solvents to be used in the pre-dispersing step can be those that are generally used for preparing a coated type magnetic tape as described, for example, in U.S. Pat. No. 4,135,016. Examples of binders are thermoplastic resins such as a vinyl chloride and vinyl acetate resin, a vinyl chloride and vinylidene chloride resin, a cellulose resin, an acetal resin, a urethane resin, or an acrylonitrile and butadiene resin. They are used alone or in combination. Examples of solvents that can be used in the present invention include ketones such as acetone, methyl ethyl ketone, methyl isobutyl ketone, ethyl isobutyl ketone or cyclohexanone; esters such as methyl acetate, ethyl acetate, butyl acetate, or monoethyl ether of glycol acetate; glycol ethers such as ether, glycol dimethyl ether or dioxane; aromatic hydrocarbons such as benzene, toluene or xylene; or chlorinated hydrocarbons such as methylene chloride, ethylene chloride, carbon teterachloride, chloroform, ethylene chorohydrin or dichlorobenzene. They are used alone or in combination. Non-polar solvents are the most preferred to conduct mixing and kneading satisfactorily.

In the mixing and dispersing of the second step, abrasive agents, lubricating agents, solvents and the like as described, for example, in U.S. Pat. No. 4,135,016 can be added in addition to additional binders. The solvents and the binders can be the same as those that are used in the pre-dispersing of the first step. Lubricating agents that can be used include a fatty acid, a fatty acid ester, silicone oil, molybdenum disulfide, tungsten disulfide, graphite or carbon black. Abrasive agents that can be used include $\alpha$-$Al_2O_3$, silicon carbide, chromium oxide ($Cr_2O_3$), corundum, artificial corundum, diamond, artificial diamond, garnet, emery, titanium oxide ($TiO_2$ and $TiO$), and the like.

In step (3), the magnetic coating composition prepared by mixing, kneading, and dispersing the ferromagnetic particles, binders, lubricating agents, etc., is coated on a non-magnetic support.

Methods for coating a magnetic layer on a non-magnetic support include an air doctor coating, a blade coating, a rod coating, an extruding coating, an air knife coating, a squeezing coating, a dip coating, a reverse roll coating, a transfer roll coating, a gravure coating, a kiss coating, a cast coating, a spray coating and a spin coating. Other methods can also be used. Specific explanation is given in more detail in "Coating Engineering", pages 253 to 277, published by Asakura Shoten (Mar. 20, 1971).

A multi-layered magnetic recording medium is prepared by coating a magnetic layer in accordance with one of those coating methods and drying it, which is continuously repeated to prepare at least a two-layered magnetic layer. Two or more layered magnetic layer can be prepared by a simultaneously multi-layered coating method, as disclosed in Japanese Patent Application (OPI) No. 98803/83 (West German Patent DT-OS No. 2,309,159) and Japanese Patent Application (OPI) No. 99233/73 (West German Patent DT-AS No. 2,309,158) (the term "OPI" as used herein refers to a "published unexamined Japanese patent application").

A magnetic layer is coated so that the drying thickness is about 0.5 to 12 μm. When a multi-layered magnetic layer is provided, it is coated so that the total thickness of the layer is in the above range. The optimum drying thickness is determined by the intended usage, shape, and standards of the magnetic recording medium.

The thus-prepared magnetic layer coated on a support is subjected to magnetic orientation, if desired, and is dried. It is also subjected to surface smoothing treatment as described, for example, in U.S. Pat. Nos. 3,473,960 and 4,135,016, or slit to a particular shape, if desired, to prepare a magnetic recording medium of the present invention.

It was found that particularly in the present invention a magnetic recording medium having a smooth surface and excellent wear resistance can be prepared when the magnetic recording medium is subjected to a surface smoothing treatment. The surface smoothing treatment can be surface smoothing treatment before drying the magnetic layer, or a calendering treatment after drying the magnetic layer.

The magnetic recording medium thus prepared in accordance with the above-described steps can have excellent dispersibility, a higher squareness ratio (SQ), and a higher S/N ratio.

The magnetic recording medium of the present invention can be prepared in accordance with the materials and methods as disclosed in Japanese Patent Application (OPI) No. 108804/77 corresponding to U.S. Pat. No. 4,135,016.

The present invention is illustrated in more detail by the following Example. In the Example, all parts are by weight.

EXAMPLE

Co-containing ferromagnetic iron oxide having a predetermined specific surface area ($S_{BET}$) was moistened to have a predetermined water content. The coating composition prepared in accordance with the following steps was coated by a reverse roll coating method on a polyethylene terephthalate film having a thickness of 14 μm, in order to have a dry thickness of 5 μm, followed by drying. The resulting magnetic web was subjected to a surface smoothing treatment and was slit to a width of ½ inch in order to prepare a magnetic tape.

(1) Step for preparing a coating composition including a pre-dispersing step:

The following composition was pre-dispersed by an open kneader for 1 hour and was mixed and was then dispersed by a sand grinder using glass beads (diameter: 1.2 mm) to prepare a coating composition.

| Composition for pre-dispersing: A-1 | |
| --- | --- |
| Co-containing magnetic iron oxide (specific surface area and water content are shown in Table 1) | 100 parts |
| Vinyl chloride-vinyl acetate-maleic anhydride copolymer (86:13:1 by weight; average degree of polymerization: 450) "400 × 110A" manufactured by Nippon Zeon Co., Ltd. | 10 parts |
| Carbon black (average particle size: 17 mμ) | 3 parts |
| Methyl ethyl ketone | 50 parts |

| Composition for mixing and dispersing: B-1 | |
| --- | --- |
| Pre-dispersed liquid | 163 parts |
| Urethane resin ("N-2301" manufactured by Nippon Polyurethane Co., Ltd.) | 6 parts |
| Butyl stearate | 1 part |
| $Cr_2O_3$ (average particle size: 0.3 μm) | 2 parts |
| Methyl ethyl ketone | 200 parts |
| Final coating composition: C-1 | |
| Mixed and dispersed liquid | 372 parts |
| Stearic acid | 1 part |
| Oleic acid | 1 part |
| Polyisocyanate ("Coronate L", trademark for product manufactured by Nippon Polyurethane Co., Ltd.) | 10 parts |

(2) Step for preparing a coating composition without a pre-dispersing step:

The following composition was mixed and dispersed for 1 hour by a sand grinder using glass beads (diameter: 1.2 mm) and the coating composition was thus-prepared.

| Composition for mixing and dispersing: B-2 | |
| --- | --- |
| Co-containing magnetic iron oxide (Specific surface area and water content are shown in Table 1) | 100 parts |
| Vinyl chloride-vinyl acetate-maleic anhydride copolymer (86:13:1 by weight; average degree of polymerization: 450) "400 × 110A" manufactrued by Nippon Zeon Co., Ltd. | 10 parts |
| Urethane resin ("N-2301" manufactured by Nippon Polyurethane Co., Ltd.) | 6 parts |
| Carbon black average particle size: 17 mμ) | 3 parts |
| $Cr_2O_3$ (average particle size: 0.3 μm) | 2 parts |
| Butyl stearate | 1 part |
| Methyl ethyl ketone | 250 parts |
| Final coating composition: C-2 | |
| Mixed and dispersed liquid | 372 parts |
| Stearic acid | 1 part |
| Oleic acid | 1 part |
| Polyisocyanate ("Coronate L", trademark for product manufactured by Nippon Polyurethane Co., Ltd.) | 10 parts |

The samples thus obtained were evaluated in the following manner and the results are shown in Table 1.

(1) Squareness ratio:

Br/Bm was measured at Hm 2 K Oe using a sample-vibrating flux meter manufactured by Toei Kogyo Co., Ltd.

(2) Vide S/N

S/N ratio was measured and was shown by a relative value to Sample No. 1 of a reference tape, using a noise meter "925C", trademark for product manufactured by Shibasoku K. K. Noise level was measured using 10 KHz high-pass filter and 4 MHz low-pass filter. The VTR (video tape recoder) used in the Example was "NV-8300", trademark for a VTR manufactured by Matsushita Electric Co.

TABLE 1

| Sample Number | Specific Surface Area of Ferromagnetic Particle ($m^2/g$) | Water Content of Ferromagnetic Particle (wt %) | Pre-Dispersing Step | Mixing And Dispersing Step | Squareness Ratio (dB) | Video S/N |
| --- | --- | --- | --- | --- | --- | --- |
| 1 | 25 | 0.8 | A-1 | B-1 | 0.87 | 0 |
| 2 | 25 | 0.8 | none | B-2 | 0.87 | 0 |
| 3 | 35 | 0.6 | A-1 | B-1 | 0.83 | +0.4 |
| 4 | 35 | 0.6 | none | B-2 | 0.80 | 0 |

TABLE 1-continued

| Sample Number | Specific Surface Area of Ferromagnetic Particle ($m^2/g$) | Water Content of Ferromagnetic Particle (wt %) | Pre-Dispersing Step | Mixing And Dispersing Step | Squareness Ratio (dB) | Video S/N |
|---|---|---|---|---|---|---|
| 5 | 35 | 0.8 | A-1 | B-1 | 0.87 | +2.5 |
| 6 | 35 | 0.8 | none | B-2 | 0.82 | +0.5 |
| 7 | 45 | 1.5 | A-1 | B-1 | 0.84 | +3.3 |
| 8 | 45 | 1.5 | none | B-2 | 0.78 | 0 |

It is clear from Table 1 that the magnetic tape prepared by using ferromagnetic particles having specific surface area $S_{BET}$ of 35 $m^2/g$ or more and having water content of 0.8 wt% or more and prepared by the method containing the pre-dispersing step and the mixing and dispersing step exhibits excellent S/N characteristic.

While the present invention has been described in detail and with reference to specific embodiments thereof, it will be apparent to one skilled in the art that various changes and modifications can be made therein without departing from the spirit and scope thereof.

What is claimed is:

1. A method for preparing a magnetic recording medium, comprising (1) pre-dispersing ferromagnetic particles having an $S_{BET}$ specific surface area of 35 $m^2/g$ or more and having an adjusted water content of 0.8 wt% or more with a binder, (2) adding an additional binder and a lubricating agent thereinto, mixing and dispersing them to prepare a dispersion of a magnetic coating composition, and (3) coating the resulting dispersion of a magnetic coating composition on a non-magnetic support.

2. A method for preparing a magnetic recording medium as in claim 1, wherein the adjusted water content of the ferromagnetic particles is from 0.8 wt% to 1.6 wt%.

3. A method for preparing a magnetic recording medium as in claim 1, wherein the $S_{BET}$ specific surface area of the ferromagnetic particles is 45 $m^2/g$ or more.

4. A method for preparing a magnetic recording medium as in claim 2, wherein the $S_{BET}$ specific surface area of the ferromagnetic particles is 45 $m^2/g$ or more.

* * * * *